Apr. 24, 1923.
M. BECKER
1,452,904
AUTO WINDSHIELD ATTACHMENT
Filed May 18, 1922
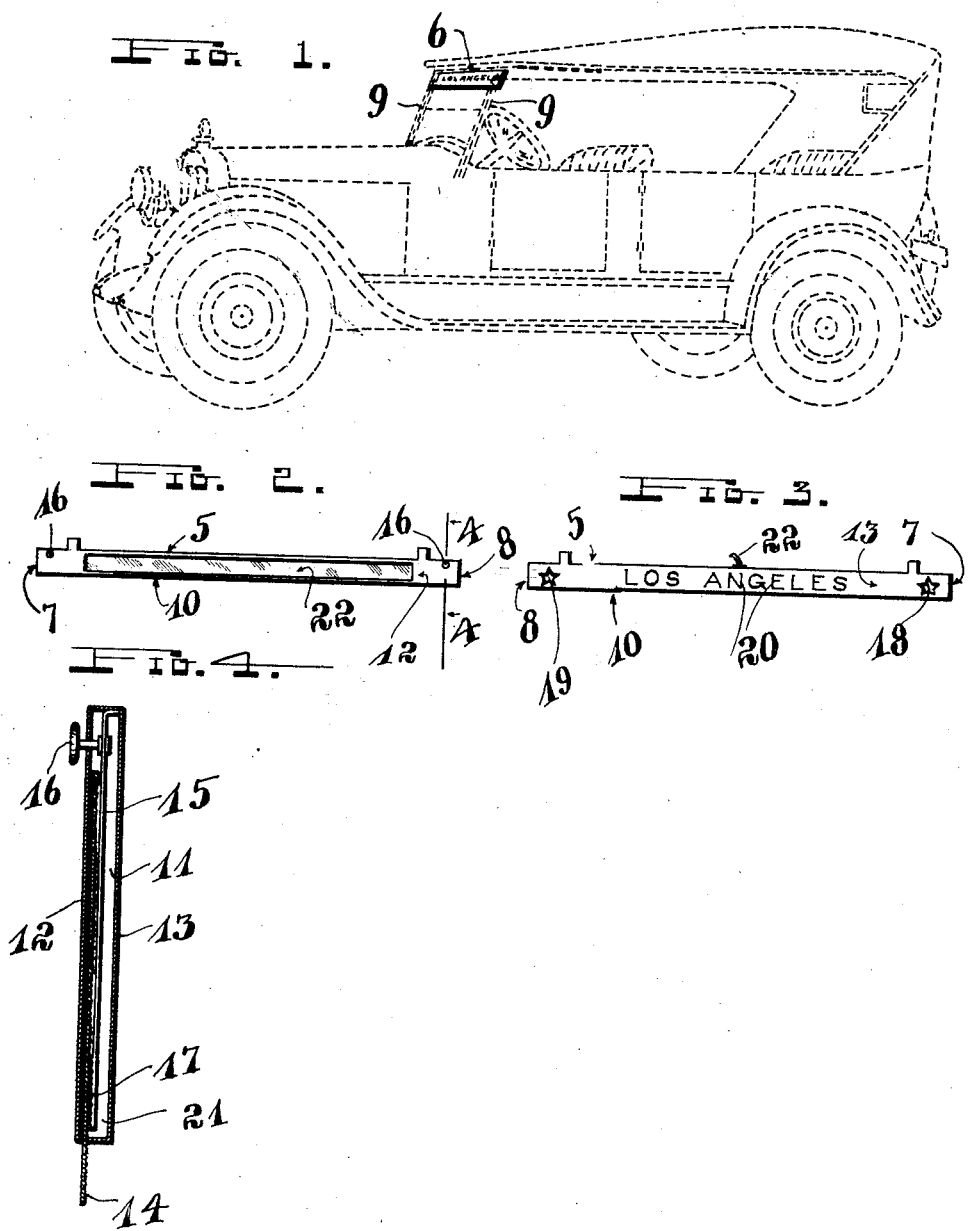
INVENTOR:
MAX BECKER,
BY: Otto H. Krueger,
his Atty.

Patented Apr. 24, 1923.

1,452,904

UNITED STATES PATENT OFFICE.

MAX BECKER, OF LOS ANGELES, CALIFORNIA.

AUTO-WINDSHIELD ATTACHMENT.

Application filed May 18, 1922. Serial No. 561,872.

*To all whom it may concern:*

Be it known that I, MAX BECKER, a citizen of the United States, residing at Los Angeles, in the county of Los Angeles and State of California, have invented a new and useful Auto-Windshield Attachment, of which the following is a specification.

This invention relates to devices applied to the windshield of automobiles to assist in the control of automobiles.

One of the objects of this invention is to provide a mirror of the size and shape to protect the driver's eyes when the automobile is headed towards a light, and serving at the same time to inform the driver under all conditions of the presence of a vehicle in rear of his own machine.

Another object is to provide a device that will serve and assist the driver of the automobile to which the device is applied as well as the driver of another machine in establishing the location and the direction of travel of each other's machines.

Another object is to provide a device with a rear-sight mirror of such a width that it will leave free vision to the driver when the device is applied to the upper edge of the wind shield over the whole width of the wind shield, having additional shading facilities for increasing the width of the mirror from the upper edge downwardly to suit the driver in approaching glaring lights.

Other objects will appear from the following description and appended claim as well as from the accompanying drawing, in which—

Fig. 1 is a perspective view of an automobile in dotted lines, illustrating the relative position of the device embodying the invention.

Fig. 2 is a rear side elevation of the device, being the side facing the driver of an automobile to which the device is attached.

Fig. 3 is a front side elevation of the device, being the side visible from the front through the wind shield.

Fig. 4 is a cross section on line 4—4 of Fig. 2.

Shading shields and rear-sight reflectors are in use, but many of these devices are unsatisfactory.

Rear-sight reflectors applied to the upper edge of the wind shield in front of the driver are becoming very popular, so are shading shields applied to the wind shield in front of the wind shield, but these two devices do not very well harmonize. Under certain conditions it becomes necessary that the shading shields are set at an angle to cover the upper portion of the wind shield to which they are attached. Mirrors of the usual type applied to the upper edge of the wind shield, in such case, become so darkened that they do not very well reflect.

It is one of the objects of this invention to overcome this defect. By uniting the shading shield and reflector into one body or one device, the whole applied to the inside of the wind shield just below the upper edge of the wind shield of an automobile, appears to avoid a darkening of the mirror-part of the device. The mirror-part of the device is furthermore extended to nearly the whole width of the wind shield, thereby apparently obtaining a reflection of light from the sides of the automobile so that the whole mirror-part reflects very well. The upper edge of the device, indicated at 5 in Figs. 2 and 3, is preferably placed near the upper edge of the wind shield of an automobile, indicated at 6 in Fig. 1. The ends 7 and 8 of the device align preferably with the supporting posts 9 of the wind shield, that is to say that the length of the device is preferably nearly equal to the width of the wind shield. The width of the device, from the upper edge 5 to the lower edge 10 is preferably not very much over two inches, to leave the driver an unobstructed view. The device is however made hollow, providing a space 11 between the rear wall or plate 12 and the front wall or plate 13, as illustrated in the cross sectional view of Fig. 4. This view is an enlarged cross section on line 4—4 of Fig. 2. A shading member 14 is shiftably suspended within the device. Spring members 15, controlled by the buttons 16 are provided near the ends of the device for controlling the movements of the shading shield or member 14. The lower end of each spring member is preferably roughened or provided with engaging means as indicated at 17, to co-act with other roughened surfaces or engaging means on the side of the shading shield 14. A slight pushing of the buttons releases the spring members 15 from the shading member 14, so that the shading member may drop out of the space 11 to increase the width of the device beyond the lower edge 10 sufficiently to provide a proper shading effect for the driver. The front plate or wall 13 is preferably perforated as illustrated in Fig. 3, two star-like perforations being indicated at 18 and 19, and an inscription in form of a perforation being indicated at 20. Connection for illuminating purposes is indicated at 21 in Fig. 4, to be behind the perforations in the front plate 13.

It will easily be understood that lights of different colors may be maintained behind the stars 18 and 19 and behind the inscription at the center 20. The two stars of different and certain colors sidewise of the central light behind the inscription easily indicates to an approaching driver the fact of an approaching automobile and the position of such an automobile, if certain lights for such devices become established and well known among automobilists.

The mirror of the device is indicated at 22 in Fig. 2, being in the rear side or plate 12 of the device.

This device serves to assist the driver of an automobile to which the device is attached as well as the driver of an approaching vehicle in controlling their machines while approaching and passing one another, the first driver being able to protect himself against the glare from the approaching machine by the shading facilities of the reflector and at the same time in a position to observe the rear.

The shading member 14 of the device is normally held within the encasing device, behind the mirror part of the device. The tension of the two spring members 15 is strong enough to hold the shading member 14 in this disappearing position. The shading material can be very thin and light since not serving any other purpose, and very light spring members are required for holding the shading member. A slight touch of the buttons 16 serves to disengage the spring members from the shading member and thereby release the shading member so that it can be lowered and drawn out of the incasing mirror-holder.

From experiments it appears that this device fully satisfies all requirements as to shading effects, and at the same time gives a clear reflection in the mirror part of the device.

To make the device indicative in both directions, to the driver of the vehicle to which the device is attached and to the driver of an approaching vehicle, is of great advantage, and, serving similar purposes resulting in one effect, appears to make it necessary to combine the several details as disclosed hereby.

Having thus described my invention, I claim:

In a wind shield attachment, a rear-sight reflector comprising a hollow body having a mirror in its rear side and having perforations in its front side, a shading member shiftably disposed in the hollow body and adapted to be lowered below the lower edge of the mirror for increasing the normal shading facilities of the mirror, and controlling means for adjustably holding the auxiliary and second-named shading member.

In testimony that I claim the foregoing as my invention I have signed my name in the presence of two subscribing witnesses.

MAX BECKER.

Witnesses:
O. H. KRUEGER,
JESSIE A. MANOCK.